(12) United States Patent
Gagneur et al.

(10) Patent No.: US 10,193,192 B2
(45) Date of Patent: Jan. 29, 2019

(54) STRUCTURE FOR MODULATING THE VOLTAGE OF A BATTERY AND THE ACTIVE EQUILIBRATION THEREOF

(71) Applicant: RENAULT s.a.s., Boulogne-Billancourt (FR)

(72) Inventors: Laurent Gagneur, Montigny-le-Bretonneux (FR); Pedro Kvieska, Versailles (FR); Ludovic Merienne, Gif-sur-Yvette (FR); Ana-Lucia Driemeyer-Franco, Montigny-le-Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 488 days.

(21) Appl. No.: 14/434,932

(22) PCT Filed: Oct. 3, 2013

(86) PCT No.: PCT/FR2013/052351
§ 371 (c)(1),
(2) Date: Apr. 10, 2015

(87) PCT Pub. No.: WO2014/057192
PCT Pub. Date: Apr. 17, 2014

(65) Prior Publication Data
US 2015/0263390 A1    Sep. 17, 2015

(30) Foreign Application Priority Data
Oct. 11, 2012 (FR) ........................ 12 02718

(51) Int. Cl.
*H01M 10/42* (2006.01)
*B60L 11/18* (2006.01)
(Continued)

(52) U.S. Cl.
CPC ..... *H01M 10/4257* (2013.01); *B60L 11/1855* (2013.01); *B60L 11/1866* (2013.01);
(Continued)

(58) Field of Classification Search
None
See application file for complete search history.

(56) References Cited

U.S. PATENT DOCUMENTS

| | | | |
|---|---|---|---|
| 2009/0134851 A1 | 5/2009 | Takeda et al. | |
| 2011/0001456 A1* | 1/2011 | Wang | H02J 7/0016 320/117 |

(Continued)

FOREIGN PATENT DOCUMENTS

| | | |
|---|---|---|
| EP | 1 947 752 | 7/2008 |
| JP | 11 215695 | 8/1999 |

(Continued)

OTHER PUBLICATIONS

International Search Report dated Apr. 7, 2014 in PCT/FR13/052351 Filed Oct. 3, 2013.

(Continued)

*Primary Examiner* — Wyatt P McConnell
(74) *Attorney, Agent, or Firm* — Oblon, McClelland, Maier & Neustadt, L.L.P.

(57) ABSTRACT

A battery of accumulators including a plurality of power storage cells and an electrical network which connects the cells to one another. The cells are grouped together in composite cells including two identical branches each including at least one cell and the composite cells being connected in series to one another. The electrical network includes: a mechanism for parallel or connection in series of the cells of each composite cell, and a mechanism for controlling the connection mechanism, which is configured to connect the cells of each composite cell in parallel or in (Continued)

series to adapt an output voltage of the battery of accumulators to a desired value and to balance charging states of the cells.

12 Claims, 2 Drawing Sheets

(51) Int. Cl.
  *H02J 7/00* (2006.01)
  *H01M 10/44* (2006.01)
  *H01M 10/48* (2006.01)
  *H01M 2/34* (2006.01)
(52) U.S. Cl.
  CPC ........... *H01M 2/34* (2013.01); *H01M 10/441* (2013.01); *H01M 10/482* (2013.01); *H02J 7/0014* (2013.01); *H02J 7/0016* (2013.01); *H02J 7/0024* (2013.01); *H01M 2010/4271* (2013.01); *H01M 2220/20* (2013.01); *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 2011/0024205 A1* | 2/2011 | Nishihara | H01M 10/48 180/65.1 |
| 2011/0045335 A1* | 2/2011 | Lee | H01M 2/1077 429/120 |

FOREIGN PATENT DOCUMENTS

| | | |
|---|---|---|
| JP | 2002 291165 | 10/2002 |
| WO | 2011 132302 | 10/2011 |

OTHER PUBLICATIONS

French Search Report dated Jun. 7, 2013 in Application No. FR 1202718 Filed Oct. 11, 2012.

* cited by examiner

STRUCTURE FOR MODULATING THE VOLTAGE OF A BATTERY AND THE ACTIVE EQUILIBRATION THEREOF

TECHNICAL FIELD TO WHICH THE INVENTION PERTAINS

The present invention relates generally to automotive vehicles with electric or hybrid propulsion.

It relates more particularly to an accumulator battery comprising a plurality of electrical energy storage cells and an electrical network which connects said cells together.

It also relates to a method for controlling the electronic components of the electrical network of this accumulator battery.

PRIOR ART

Automotive vehicles with electric propulsion are generally equipped with an electric motor and an accumulator battery dedicated to supplying current to this electric motor and diverse auxiliary items connected to the so-called "high-tension" network.

Such a battery, commonly called a "traction battery", comprises in a standard manner a casing which houses a plurality of accumulator cells, whose number is calculated in such a way that the electric motor can develop sufficient torque and sufficient power to propel the vehicle for a predetermined duration.

Each cell customarily exhibits a voltage across its terminals of the order of 2 to 5 V. These cells are then connected in series to reach the voltage level required by the application. The voltage measured across the terminals of the traction battery may thus reach 400 V.

It is however noted that as a function of the state of charge of the cells, this voltage may fall below 300 V. Now, the more the voltage declines, the more the efficiency of the electric motor decreases for certain powers. It is also noted that when the voltage declines, for a given power, the efficiency of the charging of the accumulator battery will be degraded since the charging current will be of larger amplitude (whether this charging is executed whilst stopped, by a dedicated charger, or while moving, by a means of energy recovery during braking).

It is observed moreover that the cells of the traction battery do not all exhibit the same states of charge (one speaks of a "problem of balancing the cells") due to the fact that they are not all strictly identical (their capacities and their internal resistances are not exactly equal when they exit the factory and do not evolve in the same manner over time) and that they are placed in the casing of the battery in zones that are more or less well cooled.

Thus, some of the cells of the traction battery undergo greater constraints than others, thus reducing the overall capacity of the traction battery, as well as the lifetime of this battery.

SUBJECT OF THE INVENTION

The present invention therefore proposes a new accumulator battery architecture in which the cells are connected so as to obviate the problems of balancing the cells, of declining efficiency of the electric motor and of the charger.

More particularly, there is proposed according to the invention an accumulator battery such as defined in the introduction, in which provision is made moreover for the cells to be grouped together as composite cells of an even number of cells, for the composite cells to be connected in series with one another, and for the electrical network to comprise means of connection of the cells of each composite cell in parallel or in series, and means for controlling said means of connection, which are suitable for connecting the cells of each composite cell in parallel and in series.

Thus, by virtue of the invention, it is possible to connect the cells of each composite cell, by choice, in series or in parallel, so as to adjust the voltage across the terminals of the battery to a desired voltage.

In practice, this desired voltage is that which ensures maximum efficiency for the electric motor or for the battery charger.

Moreover, by virtue of the architecture of the battery, it is possible to regularly alternate the composite cells in which the cells are connected in series with those in which the cells are connected in parallel, so as to rebalance the charges of the cells, to the benefit of the lifetime of the accumulator battery and of the range of the vehicle between top-ups.

Other advantageous and nonlimiting characteristics of the accumulator battery in accordance with the invention are as follows:

- said means of connection comprise, in each composite cell, three breaker switches;
- each composite cell comprises two identical branches, each composed of at least one cell;
- the means of connection are suitable for connecting the two branches in series or in parallel;
- the composite cells are all identical;
- the electrical network comprises means for acquiring the voltage and the current, making it possible to deduce the state of charge and/or the capacity of each composite cell and/or of each cell;
- there is provided an external casing from which there emerge two connection terminals, and the composite cells are connected in series between said two connection terminals.

The invention also proposes a method for controlling the means of connection of such an accumulator battery, comprising steps:

- of acquiring at least one operating parameter of a battery charger or of an electric motor connected to the accumulator battery,
- of deducing, as a function of said operating parameter, an optimal voltage to be delivered across the terminals of the accumulator battery,
- of acquiring the instantaneous voltages across the terminals of each composite cell and/or of each cell of the accumulator battery,
- of deducing, as a function of the instantaneous voltages acquired, a state of charge parameter of each composite cell,
- of deducing, as a function of the optimal voltage and of the instantaneous voltages acquired, the number "k" of composite cells where the cells must be connected in series so that the voltage across the terminals of the accumulator battery is substantially equal to the optimal voltage,
- of determining the "k" composite cells whose state of charge parameters are the largest in the case of a discharging of the accumulator battery or the smallest in the case of a charging of the accumulator battery,
- of controlling the means of connection of these "k" composite cells so as to connect their cells in series, and
- of controlling the means of connection of the remaining composite cells so as to connect their cells in parallel.

Advantageously, in the step of deducing the optimal voltage, a search is undertaken in a database register, each record of which associates a determined value of said operating parameter with an optimal voltage, for a record corresponding to the operating parameter acquired and the associated optimal voltage is read therefrom.

DETAILED DESCRIPTION OF AN EXEMPLARY EMBODIMENT

The description which follows with regard to the appended drawings, which are given by way of nonlimiting examples, will clearly elucidate what the invention consists of and how it can be carried out.

Figure 1:
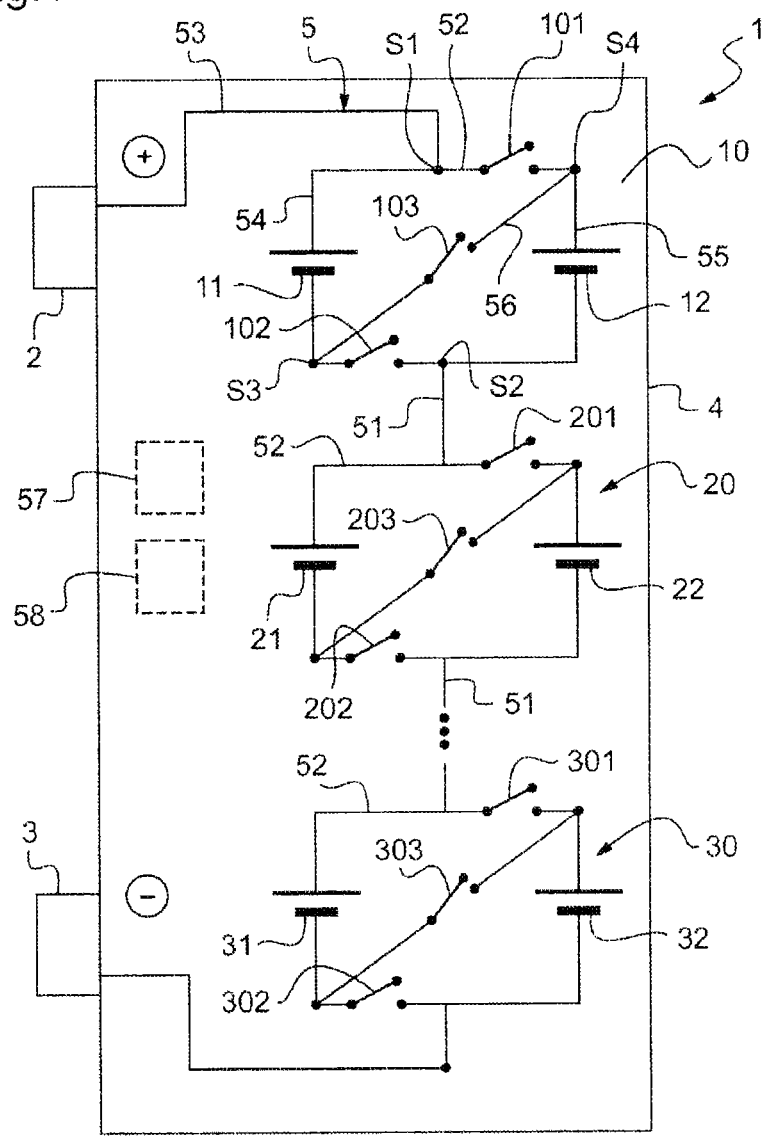
FIG. 1 is a schematic view of an accumulator battery according to the invention.

In FIG. 1, an accumulator battery 1 for an automotive vehicle has been represented.

The automotive vehicle, which has not been represented here, comprises an electric motor designed to propel the automotive vehicle, and an electric charger for recharging the accumulator battery 1.

It could also comprise recuperative braking means, making it possible to recover the energy generated by the braking of the automotive vehicle so as to recharge the accumulator battery 1.

Here the accumulator battery is a traction battery 1 dedicated to supplying current to the electric motor and diverse auxiliary items connected to the so-called "high-tension" network of the vehicle.

It conventionally comprises a storage casing 4 from which there emerge a positive 2 and a negative 3 terminal.

It also comprises, inside the storage casing 4, a plurality of electrical energy storage cells 11, 12, 21, 22, 31, 32 and an electrical network 5 which makes it possible in particular to connect these cells 11, 12, 21, 22, 31, 32 to the negative 3 and positive 2 terminals.

Here, these cells 11, 12, 21, 22, 31, 32 are of the lithium-ion type. Once charged, each of these cells exhibits a voltage across its terminals of between 2 and 5 V.

For the clarity of the drawings, only six of these cells 11, 12, 21, 22, 31, 32 have been represented in the figures.

In practice, the traction battery 1 will comprise a much higher number N thereof, chosen in such a way that the electric motor can develop sufficient torque and sufficient power to propel the vehicle for a predetermined duration.

Typically, about 200 cells will be used in such a way that the voltage across the positive 2 and negative 3 terminals of the traction battery 1 is of the order of 400 V and of sufficient capacity.

The invention then pertains more precisely to the way in which these cells 11, 12, 21, 22, 31, 32 are connected to one another.

More precisely, according to the invention, the cells 11, 12, 21, 22, 31, 32 are distributed by composite cells 10, 20, 30 of an even number of cells.

The electrical network 5 then comprises electrical conductors 51 (such as electrical wires) which connect the composite cells 10, 20, 30 in series with one another, between the positive 2 and negative 3 terminals.

The electrical network 5 comprises moreover, within each composite cell 10, 20, 30, means of connection 52 suitable for connecting the cells 11, 12, 21, 22, 31, 32 of this composite cell not only in series, but also in parallel.

The electrical network 5 then comprises furthermore controlling means 57 which are suitable for controlling said means of connection 52 so as to connect the cells 11, 12, 21, 22, 31, 32 of each composite cell 10, 20, 30, by choice, in parallel or in series.

Preferably, the composite cells 10, 20, 30 are all identical.

Such as represented in the figures, each of these composite cells comprises exactly two cells.

In FIG. 1, a preferential embodiment of the means of connection 52 has been represented.

If in this FIG. 1 the first composite cell 10 is considered, it is observed that it comprises an input point S1 connected to the positive terminal 2 via an electrical conductor 53 and an output point S2 connected to the second composite cell 20 by an electrical wire 51.

The means of connection 52 provided in this composite cell 10 for connecting the two cells 11, 12, by choice, in series or in parallel, then comprise:
- a first branch 54 which comprises electrical conductors (such as electrical wires or printed circuit tracks) for respectively connecting the two terminals of the cell 11 to the input S1 and output S2 points, and a breaker switch 102 connected between the cell 11 and the output point S2,
- a second branch 55 which comprises electrical conductors for respectively connecting the two terminals of the cell 12 to the input S1 and output S2 points, in parallel with the first cell 11, and a breaker switch 101 connected between the input point S1 and the cell 12, and
- a third branch 56 which comprises electrical conductors for connecting a point S3, situated between the cell 11 and the output point S2, to a point S4, situated between the input point S1 and the cell 12, and which comprises a breaker switch 103.

Each of the three breaker switches 101, 102, 103, being able to be for example of the MOSFET type, is therefore controllable between an enabled state and a disabled state.

The controlling means 57 are then designed to control the breaker switches 101, 102, 103 of the set of composite cells 10, 20, 30.

They are designed more precisely to control the first two breaker switches 101, 102 of each composite cell 10, 20, 30 in the same state (either both enabled, or both disabled), to control the third breaker switch 103 in the opposite state and to optionally allow a change of "live" state, that is to say when a current passes through the battery.

These controlling means are here formed by a microcontroller 57 which comprises a microprocessor (CPU), a random-access memory (RAM), a read-only memory (ROM), analog-digital converters, and various input and output interfaces.

The input interfaces allow the microcontroller 57 to acquire data relating to the electric motor, to the charger and to the cells of the traction battery 1, with a view to storing them in the random-access memory.

These input interfaces are for this purpose here connected to means for acquiring an operating parameter, in particular to a means for acquiring the rotation speed ω of the electric motor, to a means for acquiring the maximum intensity $I_{max}$ that the charger can draw, to a means for acquiring the individual voltage $U_j$ across the terminals of each cell of the traction battery 1, and to a means for acquiring the overall intensity $I_{bat}$ drawn or received by the traction battery 1.

Preferably, the means for acquiring an operating parameter comprise at least one means for acquiring the maximum intensity that the charger can draw or a means for acquiring the instantaneous rotation speed of the motor.

The processor is for its part able to execute various programs stored in the read-only memory.

It is in particular suitable for executing a program for calculating the individual capacity $Q_j$ of each cell 11, 12, 21, 22, 31, 32 as a function of the individual voltage $U_j$ across the terminals of this cell and as a function of the intensity $I_{bat}$.

This program will be able for example to be based on a software sensor algorithm of the Kalman filter type.

The read-only memory of the microcontroller 57 furthermore stores two database registers.

The first register comprises a plurality of records which each associate a span of rotation speeds ω and of currents of the electric motor with an optimal voltage $U_{opt}$ which, when it is reached, ensures optimal efficiency of the electric motor at these rotation speeds.

The second register comprises a plurality of records which each associate a span of maximum intensities $I_{max}$ that the charger can draw as well as hardware limitations to an optimal voltage $U_{opt}$ which, when it is reached, ensures optimal efficiency of the charging of the traction battery 1.

The output interfaces of the microcontroller 57 are for their part connected to the breaker switches 101, 102, 103 so as to control them to the enabled or disabled state.

The microcontroller 57 is then suitable for controlling the breaker switches 101, 102, 103 of each composite cell 10, 20, 30 so as to connect the cells of this composite cell in parallel or in series.

Figure 2:
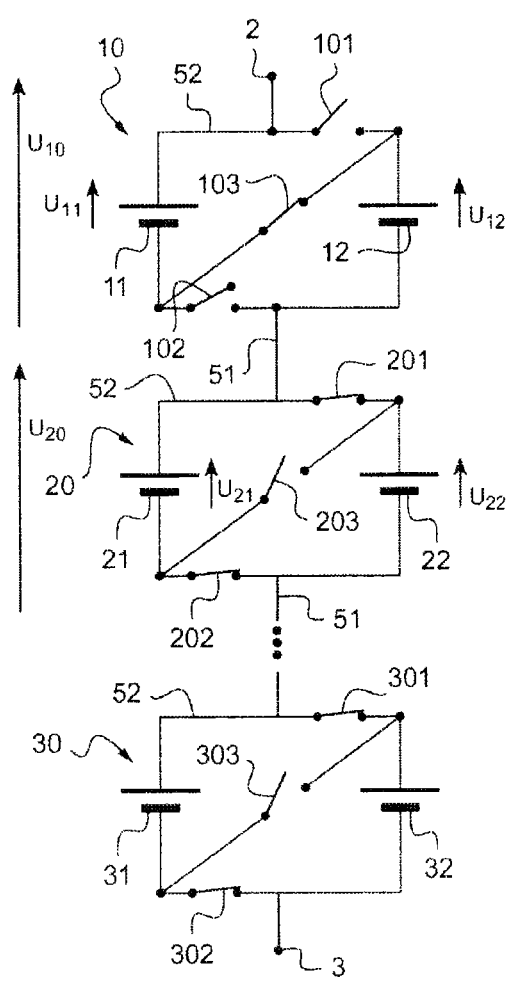
FIGS. 2 and 3 are schematic views of the cells and of the electrical network of the accumulator battery of FIG. 1, in two different states.
Figure 3:
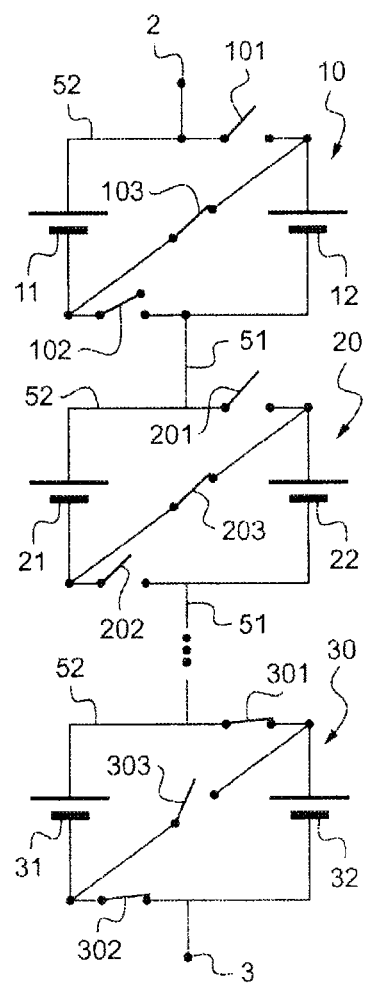

As shown by the first composite cell 10 in FIG. 2, the microcontroller 57 can thus control the breaker switches 101, 102 to the disabled state and the breaker switch 103 to the enabled state, in such a way that the two cells 11, 12 are connected in series.

Then, the overall voltage $U_{10}$ across the terminals of the composite cell 10 will be equal to the sum of the individual voltages $U_{11}$, $U_{12}$ across the terminals of the two cells 11, 12.

The overall capacity $Q_{10}$ of the composite cell 10 will for its part be equal to the minimum capacity of the individual capacities $Q_{11}$, $Q_{12}$ of the two cells 11, 12.

As shown by the second composite cell 20 in FIG. 2, the microcontroller 57 can otherwise control the breaker switches 201, 202 to the enabled state and the breaker switch 203 to the disabled state, in such a way that the two cells 21, 22 are connected in parallel.

Then, the overall voltage $U_{20}$ across the terminals of the composite cell 20 will be equal to the individual voltages $U_{21}$, $U_{22}$ across the terminals of the two cells 21, 22.

The overall capacity $Q_{20}$ of the composite cell 20 will for its part be equal to the sum of the individual capacities $Q_{21}$, $Q_{22}$ of the two cells 21, 22.

The microcontroller 57 is then programmed to maintain the voltage $U_{bat}$ across the terminals of the traction battery 1 equal to the optimal voltage $U_{opt}$, so as to ensure optimal efficiency for the electric motor or for the charger.

It is also programmed to maintain the states of charge of the various cells at the same level, so as to avoid any imbalance between the cells which would be harmful to the lifetime of the traction battery 1 and for the range of the vehicle between top-ups.

For this purpose the microcontroller 57 implements the following method.

In the course of a first step, the microcontroller 57 acquires the optimal voltage $U_{opt}$ that the traction battery 1 must exhibit across its terminals.

Accordingly, it determines firstly whether the traction battery 1 is supplying the electric motor with current, or whether it is on charge.

If the traction battery 1 is supplying the electric motor, the microcontroller 57 acquires the rotation speed ω and the current of the electric motor, and it then searches the first register for the record whose span of speeds and of current corresponds to the rotation speed ω and to the current of the electric motor acquired, and finally it reads the associated optimal voltage $U_{opt}$ from this record.

Conversely, if the traction battery 1 is on charge, the microcontroller 57 acquires the maximum intensity $I_{max}$ that the charger can draw, and then it searches the second register for the record whose span of intensities corresponds to the maximum intensity $I_{max}$ acquired, and finally it reads the associated optimal voltage $U_{opt}$ from this record.

In the course of a second step, the microcontroller 57 determines the individual state of charge of each cell 11, 12, 21, 22, 31, 32 of the traction battery 1.

Accordingly, it acquires firstly the individual voltage across the terminals of each cell 11, 12, 21, 22, 31, 32 as well as the overall intensity $I_{bat}$.

By virtue of the program stored for this purpose in its read-only memory, the microcontroller 57 deduces therefrom a fine approximation of the individual states of charge of the cells 11, 12, 21, 22, 31, 32 of the traction battery 1.

In the course of a third step, the microcontroller 57 determines the number k of composite cells in which the cells must be connected in series so that the voltage $U_{bat}$ across the terminals of the traction battery 1 is substantially equal to the optimal voltage $U_{opt}$.

The microcontroller 57 carries out this calculation as a function of the optimal voltage $U_{opt}$ and of the individual voltages $U_1$ acquired.

In the course of a fourth step, the microcontroller 57 selects the k composite cells to be connected in series in a preferential manner.

In case of charging of the accumulator battery, these k composite cells are those whose cells exhibit the lowest individual states of charge.

In case of discharging of the accumulator battery, these k composite cells are those whose cells exhibit the largest individual states of charge.

Next, it controls the breaker switches of these k composite cells so as to connect their cells in series, the breaker switches of remaining composite cells being controlled in such a way that their cells remain connected in parallel.

These four steps are repeated in a loop, in such a way that the voltage $U_{bat}$ across the terminals of the traction battery 1 remains equal to the optimal voltage $U_{opt}$ even when the latter varies.

Thus, as shown by FIG. 2, when the individual capacities of the cells decline or when the optimal voltage increases, it is possible to connect a larger number of cells in series.

The looped repetition of these four steps makes it possible moreover to prevent the k composite cells selected from remaining the same and the cells of these composite cells from discharging more quickly. On the contrary, the k composite cells selected remain those which exhibit the most extreme states of charge.

Thus, the cells whose states of charge were modified when they were connected in series can be connected in parallel, so that they are loaded less and so that they can rebalance themselves at the level of the other cells of the traction battery 1.

The present invention will be particularly profitable if the charger used is of the type of that described in document FR 2 964 510.

This charger, which we will not describe here in detail, comprises:
- a filtering stage of resistive-inductive-capacitive type, hooked up to a three-phase network,
- a voltage-stepdown stage,
- a voltage-stepup stage, hooked up to the traction battery, and
- an induction coil interposed between the voltage-stepdown stage and stepup stage.

For control reasons explained in said document, the current at the neutral point (at the output of the voltage-stepdown stage) must at any instant be greater than the intensity of the current of the three-phase local electrical network and than the overall intensity $I_{bat}$, with a safety margin.

By virtue of the invention, it is possible to maintain the overall voltage $U_{bat}$ across the terminals of the traction battery 1 at a high value. For equal power, it is therefore possible to decrease the intensity of the current $I_{bat}$ dispatched to the battery. Therefore, it is possible to decrease the intensity at the neutral point, thereby making it possible to appreciably reduce the electrical losses.

The present invention will also be particularly profitable if the electric motor used is of the synchronous type.

With such a motor, the overall voltage $U_{bat}$ across the terminals of the traction battery 1 defines a power domain that the electric motor will be able to provide.

In the case of a synchronous machine with magnets, the equations which govern the operation of the electric motor are as follows:

$$V_d = R_s I_d + L_d \dot{I}_d - \omega_r L_q I_q$$

$$V_q = R_s I_q + L_q \dot{I}_q + \omega_r (L_d I_d + \Phi_f)$$

Where:
- $V_d$ and $V_q$ are the voltages applied to the 2 axes of the Park plane of the motor (in volts),
- $I_d$ and $I_q$ are the intensities of the current flowing in the motor on the 2 axes of the Park plane (in amperes),
- $R_s$ represents the equivalent resistance of the stator of the motor (in ohms),
- $L_d$ and $L_q$ are the inductances on each axis of the motor (in henrys),
- $\omega_r$ is the speed of rotation of the magnetic field of the motor (as this is a synchronous machine, said speed is equal to the rotor rotation speed multiplied by the number of pairs of poles of the motor) (in rads/s),
- $\varphi_f$ represents the flux generated by the magnets of the rotor (in Wb).

In the simple case of a machine with smooth poles, the torque provided by the electric motor is proportional to the current $I_q$. Thus the current $I_d$ produces only Joule losses.

Now, a constraint related to the application of the voltages via an inverter is expressed thus:

$$\sqrt{V_d^2 + V_q^2} \leq \frac{U_{bat}}{\sqrt{3}}$$

To maintain the current $I_d$ as close to zero as possible, it may be useful to apply a raised voltage across the terminals of the traction battery 1, this being possible by virtue of the present invention.

The present invention is in no way limited to the embodiment described and represented, but the person skilled in the art will be able to afford any variant thereto in accordance with the spirit thereof.

As a variant, it will be possible to make provision for each composite cell to comprise not two cells, but two identical branches each composed of a set of cells connected together in series. Then, the means of connection will be suitable for connecting the two branches in series or in parallel.

This variant embodiment of the traction battery will be, on account of the reduced number of breaker switches used, less expensive. On the other hand, the control of the voltage across the terminals of the traction battery will not be as fine.

The invention claimed is:

1. An assembly comprising:
    a motor;
    an accumulator battery comprising:
        a plurality of electrical energy storage cells that convert chemical energy to electrical energy by way of an electrochemical oxidation-reduction reaction, the cells being grouped together as composite cells of an even number of cells and the composite cells connected in series with one another; and
        an electrical network which connects the cells to one another, the electrical network comprising:
            means of connection of the cells of each composite cell in parallel and in series, and
            means for controlling the means of connection, configured to connect the cells of each composite cell in parallel or in series; and
        a controller including a database register,
    wherein the controller acquires a rotation speed and a current for the motor corresponding to an optimal voltage based on the database register and controls the electrical network so that a voltage across terminals of the accumulator battery is equal to the optimal voltage.

2. The assembly as claimed in claim 1, wherein the means of connection comprises, in each composite cell, three breaker switches.

3. The assembly as claimed in claim 1, wherein each composite cell comprises two parallel branches each composed of at least one cell.

4. The assembly as claimed in claim 3, wherein the means of connection is configured to connect the two branches in series or in parallel.

5. The assembly as claimed in claim 1, wherein the composite cells are all identical.

6. The assembly as claimed in claim 1, wherein the electrical network comprises means for acquiring a voltage and/or a state of charge and/or a capacity of each composite cell and/or of each cell.

7. The assembly as claimed in claim 1, further comprising an external casing from which there emerges two connection terminals and wherein the composite cells are connected in series between the two connection terminals.

8. The assembly as claimed in claim 6, wherein the means of connection comprises circuitry configured to:
    acquire at least one operating parameter of a battery charger or of an electric motor connected to the accumulator battery;
    deduce, as a function of the operating parameter, an optimal voltage to be delivered across terminals of the accumulator battery;
    acquire an instantaneous voltages across terminals of each composite cell and/or of each cell of the accumulator battery;

deduce, as a function of the instantaneous voltages acquired, a state of charge parameter of each composite cell;

deduce, as a function of the optimal voltage and of the instantaneous voltages acquired, a number K of composite cells where the cells must be connected in series so that the voltage across the terminals of the accumulator battery is substantially equal to the optimal voltage;

determine the K composite cells whose state of charge parameters are a largest in a case of a discharging of the accumulator battery or a smallest in a case of a charging of the accumulator battery;

control the means of connection of the K composite cells to connect the cells in series; and control the means of connection of the remaining composite cells to connect their cells in parallel.

9. The assembly as claimed in claim 8, wherein when the optimal voltage is deduced, a search is undertaken in a database register, each record of which associates a determined value of the operating parameter with an optimal voltage, for a record corresponding to the operating parameter acquired and associated optimal voltage is read therefrom.

10. The assembly as claimed in claim 1, wherein the cells are of a lithium-ion type.

11. An assembly comprising:

an electric motor;

an accumulator battery comprising:

a plurality of electrical energy storage cells; and an electrical network which connects the cells to one another, the cells being grouped together as composite cells of an even number of cells and the composite cells being connected in series with one another, the electrical network comprising:

means of connection of the cells of each composite cell in parallel and in series, the means of connection comprising circuitry configured to acquire at least an operating parameter of the electric motor connected to the accumulator battery, and means for controlling the means of connection, configured to connect the cells of each composite cell in parallel or in series; and a controller including a database register, wherein the at least operating parameter is a speed of the electric motor and a current through the electric motor, and wherein the controller determines an optimal voltage based on the database register and controls the electrical network so that a voltage across terminals of the accumulator battery is equal to the optimal voltage.

12. The assembly as claimed in claim 11, wherein the at least one operating parameter of the electric motor is a rotation speed.

\* \* \* \* \*